March 26, 1935.   F. L. STONE   1,995,870
GAS DETECTOR
Filed May 12, 1932

Inventor
Fred L. Stone
by Charles E. Mullen
His Attorney

Patented Mar. 26, 1935

1,995,870

UNITED STATES PATENT OFFICE 1,995,870

GAS DETECTOR

Fred L. Stone, Schenectady, N. Y., assignor to General Electric Company, a corporation of New York Application May 12, 1932, Serial No. 610,881

1 Claim. (Cl. 23—255)

My invention relates to gas detectors and concerns particularly devices responsive to the presence in air or other gaseous mixtures of combustible or inflammable gases. More specifically my invention relates to devices of the type described in the co-pending application of Abraham L. Marshall, filed May 12, 1932, Serial No. 610,853, matured into Patent No. 1,979,976 and assigned to the same assignee as the present application.

Devices responsive to the presence of combustible gases in air or other gaseous mixtures are known in which a porous vessel containing an electrical filament or other suitable means for causing combustion of the combustible gases therein is placed in the atmosphere to be tested permitting diffusion of said atmosphere into the vessel through its porous walls. Pressure responsive means are provided which respond to the creation of a partial vacuum by the combustion of inflammable gases in the vessel thereby making the apparatus responsive to the presence of combustible gases in the gaseous mixture being tested. As pointed out in the application by Marshall, the sensitivity of the device and the uniformity of its calibration is greatly increased by providing means for insuring the maintenance of a relatively high humidity within the porous vessel.

It is an object of my invention to produce a gas responsive device of this type in which simplified means are provided for humidifying the space within the porous vessel.

A further object of my invention is to provide a simplified method and apparatus for humidifying the space within a closed container.

In accordance with my invention the top or bottom or, if desired, one of the walls of the vessel in which the combustible gases are burned is composed of a porous plate, the outer surface of which either comes in contact with moisture or dips directly into a quantity of water. Capillary attraction causes the plate to be saturated with water so that its inner surface is also kept moist. The moisture is taken up by the air within the vessel thereby raising its humidity.

Figure 1:
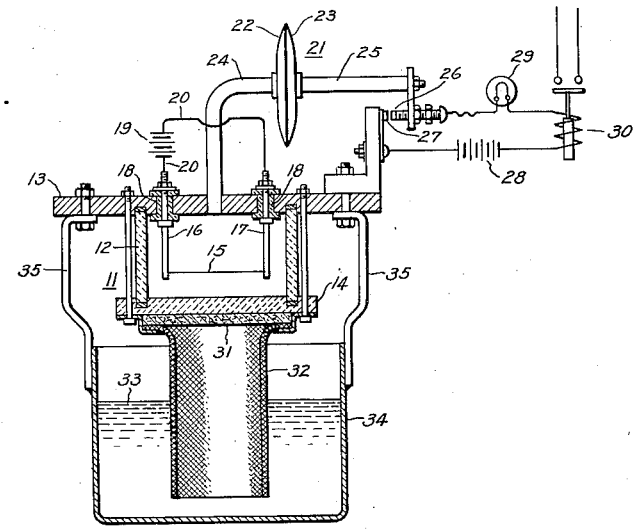
Figure 2:
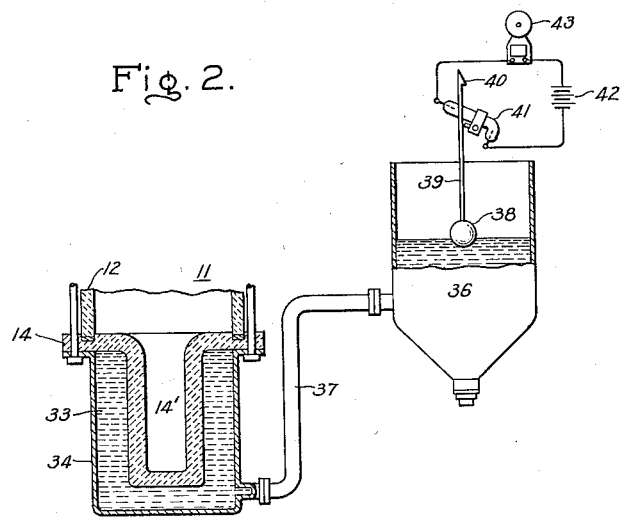

The features of my invention which I believe to be novel and patentable will be pointed out in the claim appended hereto. My invention itself however will be best understood by referring to the following description taken in connection with the accompanying drawing in which Fig. 1 represents one arrangement which may be utilized for obtaining a simple gas responsive means of high sensitivity, and Fig. 2 represents in part a modified arrangement for carrying out the invention.

Referring now more in detail to the drawing in which like reference characters refer to like parts throughout, I provide a container 11 which according to the preferred form of construction comprises a cylinder 12 of unglazed porcelain or other suitable porous material clamped between a top 13 which may, if desired, be of metal, and a porous plate 14 forming the bottom of the container 11. The container 11 is placed in the atmosphere or gaseous mixture to be tested and the porous walls 12 permit diffusion of the air or gaseous mixture into the interior of the container 11.

Suitable means are provided for causing the combustion of combustible gases or the chemical union of gases within the container 11. The combustion promoting means preferably takes the form of electrical filament 15 composed of relatively fine wire of platinum or other suitable chemically non-resistant material. The filament 15 is supported by rods 16 and 17 passing through metallic member 13. The rods 16 and 17 are insulated from the member 13 and an air-tight joint is made by means of suitable bushings 18. The rods 16 and 17 are connected to the battery 19 by means of leads 20 in order to provide the filament 15 with a source of current.

When testing atmospheres containing methane or other hydrocarbon gases or containing molecular hydrogen, a certain amount of water vapor is formed in the process of combustion and the water vapor condenses, thereby creating a partial vacuum within the container 11. A suitable pressure-responsive means which may if desired take the form of a contact-making vacuum gauge 21 is provided in order that an indication of the presence of combustible gases may be obtained or other apparatus may be placed in operation when a partial vacuum is formed in the container 11 as a result of the presence of combustible gases which are burned in the container 11.

In the arrangement illustrated, the pressure-responsive device 21 comprises a pair of circular diaphragms 22 and 23 sealed at their circumferences and supported by means of a tube 24 which provides a connection from a space formed between diaphragms 22 and 23 and the space within the container 11. The diaphragm 23 supports a member 25 which carries an electrical contact 26 cooperating with a stationary contact 27. The creation of a partial vacuum causes the diaphragms 22 and 23 to approach one another, in consequence of which the diaphragm 23 carries member 25 and contact 26 to the left. When the vacuum reaches a point corresponding to a predetermined percentage of methane or other gas being tested for, contacts 26 and 27 come together closing a circuit through battery 28, a suitable alarm or indicating device such as a lamp 29 and/or, if desired, the winding of an electrical contactor 30 which serves to place other apparatus in operation or to close a circuit for providing remote indications.

After the apparatus has been in operation for a time, the heat given off by the filament 13 would in prior art devices raise the temperature of the apparatus thereby having a drying effect on the air or gaseous mixture contained in the container 11. This action would tend to prevent or reduce the condensation of water vapor formed in the container 11 by combustion of hydrogen so that the sensitivity of the apparatus would be reduced and the calibration would gradually change. However, in order to obtain high sensitivity I insure the maintenance of a relatively high humidity in the container 11 by making the bottom portion 14 of a porous material and providing a moisture retaining member 31 composed of a suitable material such as felt covering the outer surface of plate 14 and a wick 32 in contact with the felt pad 31. The wick 32 dips into a quantity of water 33 contained in a receptacle 34. Water is carried from the receptacle 34 to the felt pad 31 through wick 32 by capillary attraction. Capillary attraction also distributes the moisture in the felt pad 31 so that a large portion of the outer surface of the porous plate 14 is moistened. Consequently, the porous plate 14 becomes saturated with moisture and its inner surface also becomes moistened as a result of capillary attraction. The moisture at the inner surface of the porous plate 14 is taken up by the air or gaseous mixture in container 11 so that the humidity in the container 11 is raised. Although I prefer to employ the felt pad 31, it will be understood that substantially the same result might be accomplished by eliminating the felt pad 31 and arranging the wick 32 so as to have a relatively large portion in contact with the outer surface of the porous plate 14. In order to form an integral unit the top piece 13 may be supported from the receptacle 34 by means of a plurality of arms 35.

A modified arrangement for humidifying the interior of container 11 is illustrated in Fig. 2 in which the porous plate 14 is changed in shape so as to have a substantially cup-shaped portion 14' dipping into the water 33 contained in receptacle 34. Since the outer surface of the plate 14 is in direct contact with water 33, capillary attraction readily saturates the porous plate and transmits moisture to its inner surface.

In order to insure an ample supply of water in container 34, the container may be connected to a reservoir 36 by means of a tube 37. The reservoir 36 is provided with a float 38 carried by a rod 39 which also carries a projection 40. When the water in reservoir 36 falls below a predetermined level the projection 40 strikes against mercury switch 41 moving it to the closed circuit position whereby a circuit is closed through a battery 42 and a suitable device 43, for example, an electric bell which provides an alarm when the water in reservoir 36 becomes exhausted.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent in the United States is:

A device responsive to the presence of combustible gases in a mixture of gases comprising a receptacle containing water, a container surrounded by a mixture of gases to be tested, said container having porous walls permitting diffusion of said mixture into said container and another porous wall substantially cup-shaped and dipping into the water contained in said receptacle, means within said container for causing the combustion of combustible gases therein, and means responsive to fall in pressure within said container resulting from the combustion of gases therein, said substantially cup-shaped porous wall serving to transmit moisture from its outer to its inner surface by capillary attraction permitting the gaseous mixture within said container to take up moisture to raise its humidity, thereby facilitating reduction in volume of products of combustion and increasing the sensitivity of said device.

FRED L. STONE.